United States Patent [19]
DeKoning et al.

[11] Patent Number: 6,055,228
[45] Date of Patent: Apr. 25, 2000

[54] METHODS AND APPARATUS FOR DYNAMIC TOPOLOGY CONFIGURATION IN A DAISY-CHAINED COMMUNICATION ENVIRONMENT

[75] Inventors: Rodney A. DeKoning; Charles D. Binford; Jeremy D. Stover, all of Wichita, Kans.

[73] Assignee: LSI Logic Corporation, Milpitas, Calif.

[21] Appl. No.: 08/771,006

[22] Filed: Dec. 23, 1996

[51] Int. Cl.$^7$ ................................................ H04L 12/28
[52] U.S. Cl. ................................. 370/258; 395/200.5
[58] Field of Search ........................... 370/222, 223, 370/224, 405, 406, 434, 452, 258; 340/825.05; 395/200.5, 200.81; 359/161, 122

[56] References Cited

U.S. PATENT DOCUMENTS

| | | | |
|---|---|---|---|
| 4,009,469 | 2/1977 | Boudreau et al. | 340/147 |
| 4,042,780 | 8/1977 | Wolters | 179/15 AL |
| 4,064,369 | 12/1977 | Battocletti | 179/15 |
| 4,454,508 | 6/1984 | Grow | 370/89 |
| 4,736,465 | 4/1988 | Bobey et al. | 455/612 |
| 4,837,856 | 6/1989 | Glista | 455/601 |
| 4,927,225 | 5/1990 | Levinson | 350/96.18 |
| 5,134,619 | 7/1992 | Henson et al. | 371/40.1 |
| 5,151,898 | 9/1992 | Kondo | 370/85.15 |
| 5,182,747 | 1/1993 | Frenzel, III et al. | 370/85.5 |
| 5,249,183 | 9/1993 | Wong et al. | 370/85.3 |
| 5,251,213 | 10/1993 | Videlock et al. | 370/85.12 |
| 5,289,467 | 2/1994 | Kartalopoulos | 370/85.5 |
| 5,289,589 | 2/1994 | Bingham et al. | 395/425 |
| 5,297,134 | 3/1994 | Takahashi et al. | 370/16.1 |
| 5,317,198 | 5/1994 | Husbands | 307/116 |
| 5,406,401 | 4/1995 | Kremer | 359/110 |
| 5,459,772 | 10/1995 | Asano et al. | 379/5 |
| 5,467,369 | 11/1995 | Vijeh et al. | 375/224 |
| 5,485,576 | 1/1996 | Fee et al. | 395/185.09 |
| 5,490,007 | 2/1996 | Bennett et al. | 359/139 |
| 5,517,489 | 5/1996 | Ogura | 370/16.1 |
| 5,517,498 | 5/1996 | Hauris et al. | 370/71 |
| 5,522,047 | 5/1996 | Grow et al. | 395/200.2 |
| 5,535,035 | 7/1996 | DeFoster et al. | 359/161 |
| 5,617,425 | 4/1997 | Anderson | 371/10.2 |
| 5,659,570 | 8/1997 | Cotreau et al. | 375/5 |

FOREIGN PATENT DOCUMENTS

| | | | |
|---|---|---|---|
| 0453273 | 10/1991 | European Pat. Off. | H04L 12/42 |
| 2617354 | 12/1988 | France | H04L 11/16 |

*Primary Examiner*—Chi H. Pham
*Assistant Examiner*—Kim T. Nguyen

[57] ABSTRACT

A loop isolation circuit (LIC) to enable subdivision of a single daisy-chained communication loop (e.g., FC-AL) into smaller loops and to enable joining of smaller loops into a single larger loop. An LIC comprises essentially two multiplexors configured so as to permit controlled subdivision or joining of two loop portions. In a first selected state, the LIC subdivides a communication loop in which it is inserted into two loops. This configuration sacrifices accessibility among some devices previously on the larger loop for the benefit of enhanced bandwidth and reduced overhead due to node count. Bandwidth is enhanced by enabling simultaneous operation of two (or more) loop portions for establishing and communicating over logical circuit connections. However, when a failure of a redundant loop precludes access to devices, the LIC may be set to a second state to rejoin previously subdivided loops into a larger loop. This configuration restores access among all devices sharing common access to the larger loop. The LIC of the present invention therefore enables communication loop controllers to dynamically reconfigure a daisy-chained loop communication system to enhance performance in normal operation. The LIC of further enables restoration of the larger loop to restore redundant loop configurations. The LIC of the present invention is applicable in many daisy-chained loop communication environments including, but not limited to, Fiber Channel Arbitrated Loop (FC-AL).

10 Claims, 11 Drawing Sheets

METHODS AND APPARATUS FOR DYNAMIC TOPOLOGY CONFIGURATION IN A DAISY-CHAINED COMMUNICATION ENVIRONMENT

RELATED PATENTS

The present invention is related to commonly assigned and co-pending U.S. patent application entitled "Method And Apparatus For Providing Loop Coherency", invented by Dennis J. Hahn and Jeremy Stover, and having an internal docket number of 96-073 and a serial number of 08/772,616, filed concurrently herewith on, and co-pending U.S. patent application entitled "Port Bypass Circuit With Loopback Capability", invented by Charles Binford and Jeremy Stover, and having an internal docket number of 96-025 and a serial number of 08/776,615, filed concurrently herewith on Dec. 23, 1996, both of which are hereby incorporated by reference.

BACKGROUND OF THE INVENTION

1. Field of the Invention

The present invention relates to daisy-chained communication devices and in particular relates to apparatus and associated methods for enabling dynamic reconfiguration of daisy-chained communication topologies to subdivide or reconfigure daisy-chained communication systems for improved performance.

2. Description of Related Art

Daisy-chained communication media and methods are now commonly applied to interconnect a plurality of communication control devices. In the application of such communication media to computer mass storage interfaces, one or more storage controller devices (e.g., host adapters or RAID controllers) may be connected to a plurality of storage devices (e.g., disk drives or array modules) by redundant daisy-chained communication strings or loops. Fibre Channel Arbitrated Loops (FC-AL) and IBM's Serial Storage Architecture (SSA) are common applications of such communication standards for the interconnection of storage controllers and storage devices.

A string or loop communication medium is often configured in a daisy-chained manner as distinct from a bus configuration. In other words, information flows from one device, through the medium, into the neighboring device. The neighboring device determines whether the information is to be processed therein or to be directed to another device. If the information is to be processed by another device, the neighboring device repeats the process and transmits (forwards) the information to its neighbor, etc., until the information reaches its intended destination. In other words, all information passes through intervening nodes on its way from a source device to a destination device. This is as distinguished from a bus configuration in which all nodes exchange information over a bus connecting all devices in a parallel fashion.

FC-AL devices perform arbitration when one node wishes to establish a link (a logical circuit) to a second node. When the temporary circuit is established, all other nodes on the loop are essentially idle—operating in a monitoring state to pass all received messages to its downstream neighbor, toward the destination node. Therefore, only two devices on a loop are using bandwidth of the loop at a given point in time. It is therefore a problem in FC-AL applications that a large number of nodes on the medium are idle while only two devices consume the entire bandwidth of the communication medium.

In addition, since FC-AL communications between an initiator and target pass through all nodes on the loop, each node may impart a delay before the message is passed on to its neighbor node for routing to the intended target. The cumulative delay generated is therefore proportional to the number of nodes in a communication loop. FC-AL communication bandwidth is therefore, in part, limited by the number of nodes on the loop. It is therefore another problem in FC-AL applications that large loops consume a part of the available media bandwidth in wasted delay times in proportion to the number of nodes on the loop.

SSA applications may be configured in string or loop daisy-chained configurations. In addition, switching port devices (essentially routing devices operable based on the device addressing) may be used to create "network" topologies combining various loops, strings, and networks. In accordance with SSA standards, a message is sent from a first node to a second node on the medium (on the string, loop or network). In general, messages generated in response to receipt of the first message are returned from the second node to the first node in the opposite direction on the same string, loop, or network. As in FC-AL applications, intervening nodes in the path between to communicating nodes are occupied to pass received information from their upstream neighbor to their downstream neighbor. However, only those nodes on the segment of the medium intervening the two communicating nodes are so occupied. The number of such intervening nodes is referred to as the "hop count." The entire bandwidth of the segment of the SSA medium between two communicating nodes is therefore consumed by a single pair of communicating nodes. The remaining segment(s) of the SSA medium is (are) available for use other communicating nodes.

In an SSA loop communication application, information may flow in either direction around the loop from a first node to a second node. One path may be in use by other communicating nodes or one path around the loop may have fewer intervening nodes (smaller hop count) than the other path. Therefore, in SSA loop configurations, there exists a preferred direction and path for communicating between two nodes—that which has the fewest intervening nodes and/or is available. SSA nodes (in a loop configuration in particular) therefore determine the preferred path for communications when a transfer is initiated to another node.

Spatial reuse techniques are applied to SSA communication media to utilize unused segments of the SSA medium for other communicating devices while other segments are in use by particular communicating pair of nodes. However, it remains a problem that the particular intervening nodes in any one segment of the SSA medium are precluded from use of the SSA medium bandwidth while that segment is in use. Placement of nodes in an SSA communication medium may therefore affect the overall utilization of the available bandwidth. If a particular pair of nodes are frequently communicating, the intervening nodes between that pair are precluded from any use of the SSA medium, despite that fact that other portions of the medium (outside the section used by a currently communicating pair of nodes) are available for other communication traffic (as provided by spatial reuse techniques).

In addition, as for FC-AL applications, a larger hop count translates to larger delay times for communications due to the delay imposed as the messages pass through each intervening node. A smaller hop count is therefore desirable.

The topology of FC-AL and SSA communication applications is generally fixed and determined by the cabling configuration connecting nodes to the medium. Presently known techniques and devices do not therefore allow the topology to be reconfigured to optimize the topology for particular benefit of the application. For example in SSA applications where a plurality of storage control modules and storage devices are connected to the medium, one ordering of the devices on the medium may be preferred where the controllers operate independent of one another (i.e., minimize hop counts between each controller and the storage devices) while another ordering may be preferred where the controllers cooperate to provided redundant and/or mirrored operation (i.e., minimize hop count between the cooperating controllers). More generally, it would be desirable to permit reconfiguration of a daisy-chained communication medium to optimize available bandwidth and bandwidth utilization in response to a particular operational environment in which the communication application is started.

It is apparent from the above discussion that a need exists for methods and associated apparatus which permit performance tuning and optimization of a daisy-chained communication application topology to increase available bandwidth and/or to improve bandwidth utilization.

SUMMARY OF THE INVENTION

The present invention solves the above and other problems, thereby advancing the state of the useful arts, by providing apparatus and associated methods of operating same to increase available bandwidth and to enhance bandwidth utilization of daisy-chained communication topologies. The present invention provides circuits and methods for applying same to reconfigure the topology of a daisy-chained communication application. Though the present invention may be applied to a wide variety of daisy-chained communication applications, the presentation herein focuses primarily on application to storage subsystems which utilize daisy-chained communication media and protocols to connect storage devices with storage control modules. Such applications often include a plurality of storage devices and a plurality of control modules all interconnected by the daisy-chained communication medium. The control modules communicate with the storage devices to store and retrieve data. In many such storage applications (e.g., redundant/mirrored controller and/or RAID applications) the controllers communicate amongst one another to coordinate access to the storage devices.

The reconfiguration enabled by the apparatus and methods of the present invention may be dynamically applied, for example, at initial startup of the subsystem or during operation of the subsystem in response to changes in the operating environment. The present invention is applicable to FC-AL applications having redundant loops as well as many SSA applications to improve effective communication performance among the devices on the medium.

It is common in FC-AL configurations to have redundant loops to enhance the reliability of the storage subsystem. Though a first loop becomes inoperable, the second loop may remain operational. For example, FC-AL specification allow for two (or more) loops connecting each device in the subsystem. When the first loop is inoperable for some reason, information can be diverted to the other loop to enable continued communications with all devices on the redundant loops. The present invention specifically provides a loop isolation circuit which is capable of switching states to join or separate two communication loop portions. When the loop portions are joined, the two loop portions effectively become one thereby making all devices on both loop portions accessible to one another as on a single loop. When the loop isolation circuit again separates the loops into two portions, each loop portion may be used independently and in a manner to enhance performance by reducing the node count on each loop portion.

The present invention therefore allows for improved bandwidth utilization by allowing dynamic configuration to subdivide a single loop into two (or more) loop portions. When the loop is subdivided, there are fewer intervening nodes imposing delays between any two communicating nodes on each loop portion. The present invention also allows the subdivided loop portions to be automatically joined to permit access to otherwise inaccessible devices in case of a failure of the redundant loop structure.

The present invention further enhances performance of the FC-AL communication subsystem by effectively increasing the available bandwidth. When a large loop is subdivided into two (or more) loop portions, each portion may be simultaneously operating. Therefore, two nodes on each of the two (or more) loop portions may be simultaneously communicating. This feature of the present invention effectively increases the available bandwidth by a factor equal to the number of loop portions divided off of the larger loop (e.g., by a factor of two when a large loop is subdivided into two loop portions). The enhanced bandwidth is derived at the cost of connectivity in that the nodes are subdivided and distributed among the loop portions. Therefore, nodes on one loop portion cannot communicate with nodes on another loop portion. However, in a dual loop configuration, as is common in FC-AL applications, the redundant loop may remain undivided to permit full connectivity on at least one of the two redundant loops. In addition, as noted above, the present invention allows the loop portions to be re-joined, if necessary, to restore the connectivity among all nodes on the original large loop.

In particular, the present invention provides a loop isolation circuit (LIC) which is similar in structure to the port bypass circuit with loopback capability defined in co-pending patent application 96-025 (which is herein incorporated by reference). The loop isolation circuit (LIC) is inserted into a communication loop medium in such a manner as to permit one of two states to be controllably selected: a first state in which the loop is a single contiguous loop, and a second state wherein the single loop is subdivided into two loop portions. In normal operation, where there is no device or loop failure, the LIC may be configured in the second state to subdivide the loop into two loop portions. This state allows enhanced bandwidth utilization because the size of each of the two portions is reduced to thereby reduce the node count between communicating node on the loop. However, if another loop portion (a loop or loop portion for which the present loop is a redundant mate) becomes inoperable, the LIC of the present invention may be switched to the first state in which the two loop portions are re-joined. In this first state, all devices normally accessible through the single loop configuration are again accessible.

More specifically, the LIC of the present invention comprises a pair of multiplexors, or similar switching devices, configured in such a manner as to connect either of two input signal paths to either of two output signal paths. The signal paths to be connected may be, for example, Fibre Channel signal connections, or other similar daisy-chained communication media. More generally, the multiplexors may be any similar multiplexing or switching means which provide appropriate switching signal capacity and performance for the particular communication medium.

In a second embodiment of the present invention, multiple LICs may be applied to a single FC-AL loop, or hierarchically deployed within subdivided portions of an FC-AL loop to further enhance performance in a flexible manner while retaining the redundant reliability essential to the storage subsystem.

In an SSA applications, the LIC of the present invention is connected to the SSA medium in such a manner as to allow controlled reconfiguration of the topology. Specifically, the medium may be controllably reconfigured through the LIC to alter the relative position of nodes on the SSA media segments. Altering the relative position of nodes on the SSA media allows the hop count between particular nodes to be altered. More importantly, devices may be repositioned by the reconfiguration process such that certain device pairs which frequently communicate may be isolated to a particular segment of the media (e.g., they can be adjacent neighbors having a hop count of zero). Such a reconfiguration makes all other segments of the SSA media available for use by other devices. No device intervene between the frequently communicating devices and therefore no devices are precluded from using other segments of the SSA media while the frequently communicating pair are actively exchanging information.

For example, consider an SSA application which includes a plurality of storage control modules and a plurality of storage modules interconnected on the SSA medium. If the controllers operate independently to access information on the storage devices, the preferred positioning of the controllers is interspersed among the storage devices to reduce the average hop count between any controller and any storage device. If, however, the controllers are operable in a cooperative manner (e.g., as redundant/mirrored controllers), the controllers may require frequent inter-controller communications. In such an environment, positioning the controllers adjacent one another on the SSA medium reduces the number of (eliminates) intervening nodes between the controllers to thereby improve the potential benefit of spatial reuse for remaining segment(s) of the SSA medium. Or, for example, one of the controllers may require more frequent access to a particular subset of the storage devices (e.g., a RAID LUN) as opposed to others of the storage devices. The present invention may therefore be applied to reconfigure the topology of the communication media to localize the exchange of information between associated devices to as small a segment of the SSA media as possible. This feature also enables improved benefits from spatial reuse techniques applied to the SSA medium.

In such a configuration, the LIC of the present invention may be switched between two states: a first state to bandwidth utilization (including spatial reuse) for one set of devices, and a second state to optimize for another set of devices. This use of the LIC of the present invention therefore allows dynamic reconfiguration of the SSA loop geometry to improve utilization of bandwidth in an SSA application.

The present invention therefore provides a simple apparatus for controllably reconfiguring a daisy-chained communication medium to enhance communication performance.

It is therefore an object of the present invention to provide apparatus and methods for operating same which permits reconfiguration of a daisy-chained communication medium to increase available bandwidth.

It is therefore an object of the present invention to provide apparatus and methods for operating same which permits reconfiguration of a daisy-chained communication medium to improve available bandwidth utilization.

It is a further object of the present invention to provide apparatus and methods for operating same which permit dynamic reconfiguration of a daisy-chained communication loop by subdividing the loop into a plurality of smaller loop portions.

It is still another object of the present invention to provide apparatus and methods for operating same which permit dynamic subdivision of a communication loop and subsequent reconfiguration to join subdivided portions.

It is yet another object of the present invention to provide apparatus and methods for operating same which permit dynamic reconfiguration of a communication loop to alter the relative positions of devices on the daisy-chained communication medium.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

The circuit of the present invention is useful in communication applications wherein a communication medium is connected to a number of devices in a so-called "daisy-chained" manner. In such a daisy-chain configuration, the communication medium is connected in series from one device to the next. The signals transmitted on the communication medium are routed into a communication control device, processed in accordance with the protocols and content of the data, and then, depending upon the processing performed (if any) routed out of the communication control device on to the next device.

In particular, the present invention is applicable to daisy-chained communication media. In such a loop configuration daisy-chained communication medium, all devices in the chain may communication with any other device in the chain by directing information around the loop. Some common loop configurations, such as Fibre Channel Arbitrated Loops (FC-AL) or Serial Storage Architecture (SSA), permit (or in the case of SSA-require) redundant loops. Rules regarding the use of the redundant connections vary in accordance with the requirements of the particular protocols and applications. In general, there are two paths by which data may be transferred from a first device to a second device.

Figure 3:
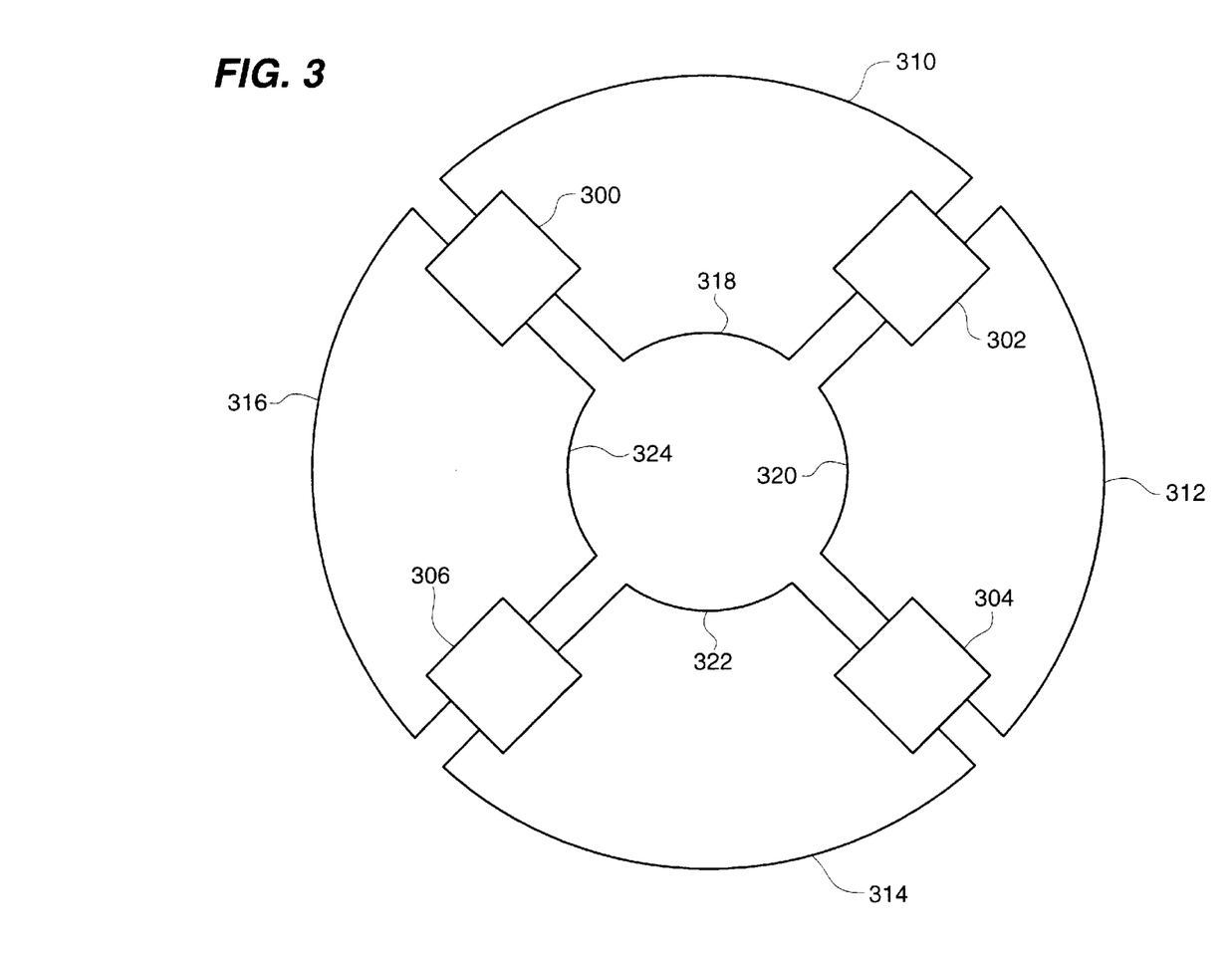
FIG. 3 is a block diagram of a generalized daisy-chained communication loop application.

FIG. 3 is a generalized depiction of a typical daisy-chain communication loop application having redundant (dual) loops connecting a plurality of devices. Communication control devices 300, 302, 304, and 306 are all commonly connected to each of two communication loops. A first loop is comprised of loop segments 310, 312, 314, and 316 while the second loop is comprised of loop segments 318, 320, 322, and 324. Signals applied to a segment (e.g., 310) flow into a first device (e.g., 302), then out of that device via the next segment (e.g., 312) to the next device (e.g., 304), etc. In like manner, signals applied to a segment (e.g., 318) flow into a first device (e.g., 300), then out of that device via the next segment (e.g., 324) to the next device (e.g., 306), etc.

As used herein, "daisy-chain" is intended to represent any such communication applications wherein information is passed from one device attached to the communication medium to the next and so on. Fibre Channel Arbitrated Loops are one example of such communication applications. In addition, as used herein, a "loop" is any such daisy-chained communication medium applied in such a manner as to topologically represent a ring or circle of alternating loop segments and communication control devices.

Data generally flows in one direction in a particular communication medium loop. Relative to a communication control device attached to segments of the communication medium, the segment from which data is received is referred to herein as the "upstream" segment or "upstream side" while the other segment, to which data is transmitted, is referred to herein as the "downstream" segment or the downstream side."

The direction of information flow in such a loop as well as other attributes governing data flow on the loop are often constrained by the specifications of the particular protocol in use on the loop. The methods of the present invention may be advantageously applied to many such configurations and protocols.

A first embodiment of the present invention provides for subdividing one of the redundant loops to provide additional bandwidth as well as improved bandwidth utilization but at the cost of fully redundant access among all devices on the loops. However, the LIC of the present invention may controllably re-join the subdivided portions at any time to restore the fully redundant access of the original configuration.

A problem in such loop topologies arises in that for a first device to communicate with a second device, a number of intervening devices each need to receive the information and forward it to a neighbor for further processing. Each intervening node imposes some overhead processing delay before determining that the information is to be passed on to a neighboring device for further transmission around the loop. This overhead processing reduces the usable bandwidth of the medium and is also referred to herein as node delay bandwidth overhead. This overhead processing is typically implemented as application specific circuits to minimize this overhead processing. None the less, the cumulative overhead processing of a large number of intervening nodes can be significant.

The present invention therefore provides a loop isolation circuit (LIC) which permits the automated subdivision of a loop into two (or more) loop portions as well as the joining of two loop portions into a single loop. A larger single loop enables access to any device on the loop from any device on the loop. A single loop configuration is therefore useful when a loop must be relied upon to provide redundant access to a device in case of failure of another loop or loop portion.

A plurality of smaller loops, subdivided from a single large loop, provides improved performance by adding available bandwidth to the topology. When a larger loop is subdivided into two (or more) loop portions, all loop portions may be simultaneously active. In particular, FC-AL applications include an arbitration process by which an node establishes a peer-to-peer logical circuit to another node. When the link is established, all other nodes on the loop are in a monitoring state to simply pass received messages to their downstream neighbors. By subdividing a large loop into two (or more) loop portions, the available bandwidth is thereby multiplied by a factor of two (or more). By re-joining previously subdivided loop portions, the available bandwidth is thereby reduced by a factor of two (or more) but communication is restored between all nodes on the larger loop.

For example, a 100 MB/second Fibre Channel Arbitrated Loop when subdivided provides two (smaller) loops each operating a 100 MB/second thereby allowing up to 200 MB/second bandwidth utilization. The addition of a redundant Fibre Channel loop therefore permits a total of 300 MB/second (200 via the subdivided portions of the first loop plus 100 via the second redundant loop). The second redundant loop provides the connectivity required among all devices while the subdivided loop portions provide improved bandwidth utilization at the cost of reduced access among the devices. The LIC of the present invention therefore allows automatic selection of either of these configurations as the needs of the application dictate.

LIC GENERAL EMBODIMENT

The LIC of the present invention applies a loop resiliency circuit (LRC) discussed in co-pending patent application 96-025. The LRC is disclosed therein as applied to loopback testing of devices on daisy-chained communication media. The LRC as applied in the present invention, enables switching two loop portions so as to separate them for improved performance or to join them for reliability purposes.

As noted in co-pending patent application 96-025, the LRC comprises a pair of bypass circuits. The circuits individually are known to the art as discussed in Annex I of the ANSI draft specification entitled FIBRE CHANNEL ARBITRATED LOOP FC-AL (ANSI specification X3.272-1996—readily available in industry). The combination of two such circuits in the present invention permits two loop portions to be joined into, or subdivided from, a larger communication loop.

Figure 1A:
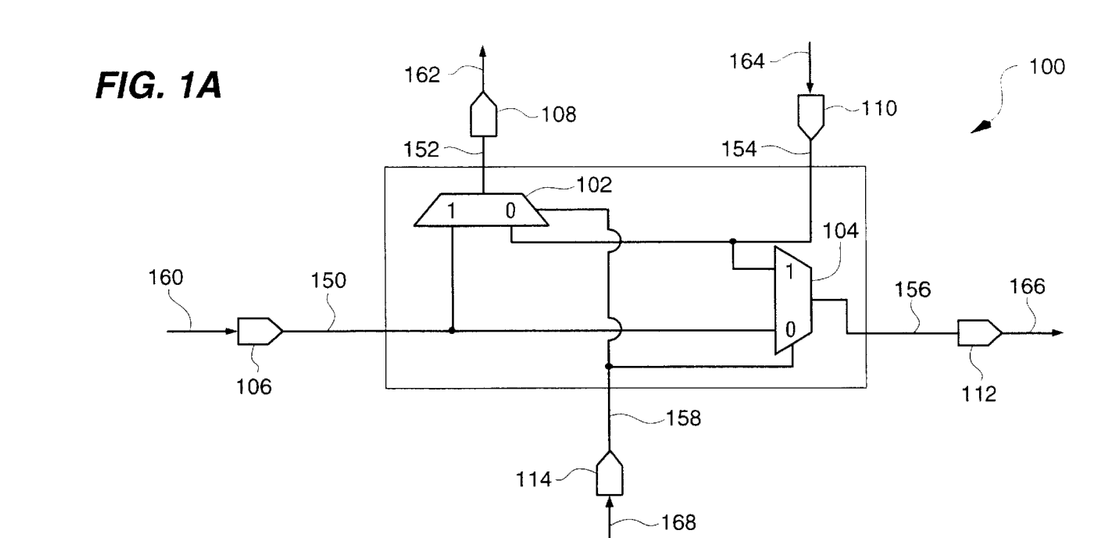
FIGS. 1A–1C are block diagrams of the LIC of the present invention including a functional presentation of the two selectable states of the LIC.

FIG. 1A is a block diagram of an LIC circuit 100 of the present invention. As is the LRC of co-pending patent application 96-025, the LIC circuit 100 is a combination of two MUXs configured and applied in such a way as to permit joining or separation of two loop portions. Input signal paths 160 and 164 each represent upstream portions of the daisy-chained communication medium (relative to the LIC circuit 100). Output signal paths 162 and 166 represent downstream portions of the daisy-chained communication medium. Control signal input path 168 provides a selection signal for MUXs 102 and 104. Buffers 106, 108, 110, 112, and 114 buffer external signal paths 160–168 from corresponding internal signal paths 150–158, respectively, of the LIC circuit 100.

MUX 102 selects either of two communication loop upstream input paths 150 and 154 and applies signals thereon to downstream output signal path 152. MUX 104 selects either of two communication loop upstream input paths 150 and 154 and applies signals thereon to downstream output signal path 156. Selection of MUXs 102 and 104 depends upon the signal applied to path 158 by an external control circuit (not shown).

Figure 1B:
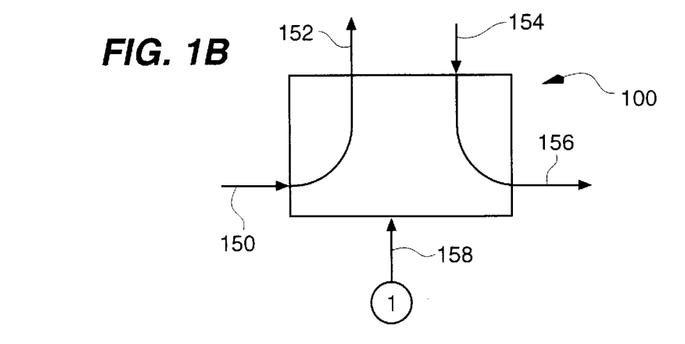
Figure 1C:
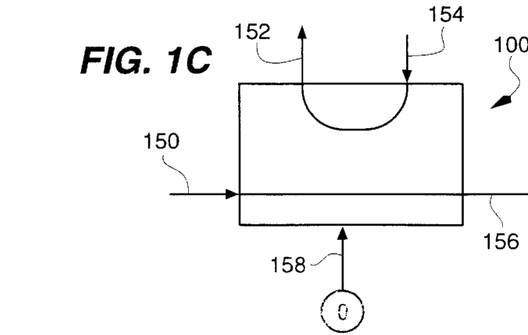

FIGS. 1B and 1C depict the LIC circuit 100 in a logical first operational state and a logical second operational state, respectively. In the first state of FIG. 1B, MUXs 102 and 104 are controlled by an input value of "1" applied to path 158. In this state, upstream daisy-chain communication loop input path 150 is connected to downstream daisy-chain communication loop output path 152 and upstream daisy-chain communication loop input path 154 is connected to downstream daisy-chain communication loop output path 156. In the second state of FIG. 1C, MUXs 102 and 104 are controlled by an input value of "0" applied to path 158. In this state, upstream daisy-chain communication loop input path 150 is connected to downstream daisy-chain communication loop output path 156 and upstream daisy-chain communication loop input path 154 is connected to downstream daisy-chain communication loop output path 152.

By controlling the selection of MUXs 102 and 104 of FIG. 1A, the two states of FIGS. 1B and 1C may be utilized to reconfigure a loop communication medium. In the first state of FIG. 1B, two portions of a communication medium may be joined to make a single loop out of two to assure reliable access to all devices on both loop portions. In the second state of FIG. 1C, one loop is subdivided into two loop portions to improve performance of the communication system.

Figure 2:
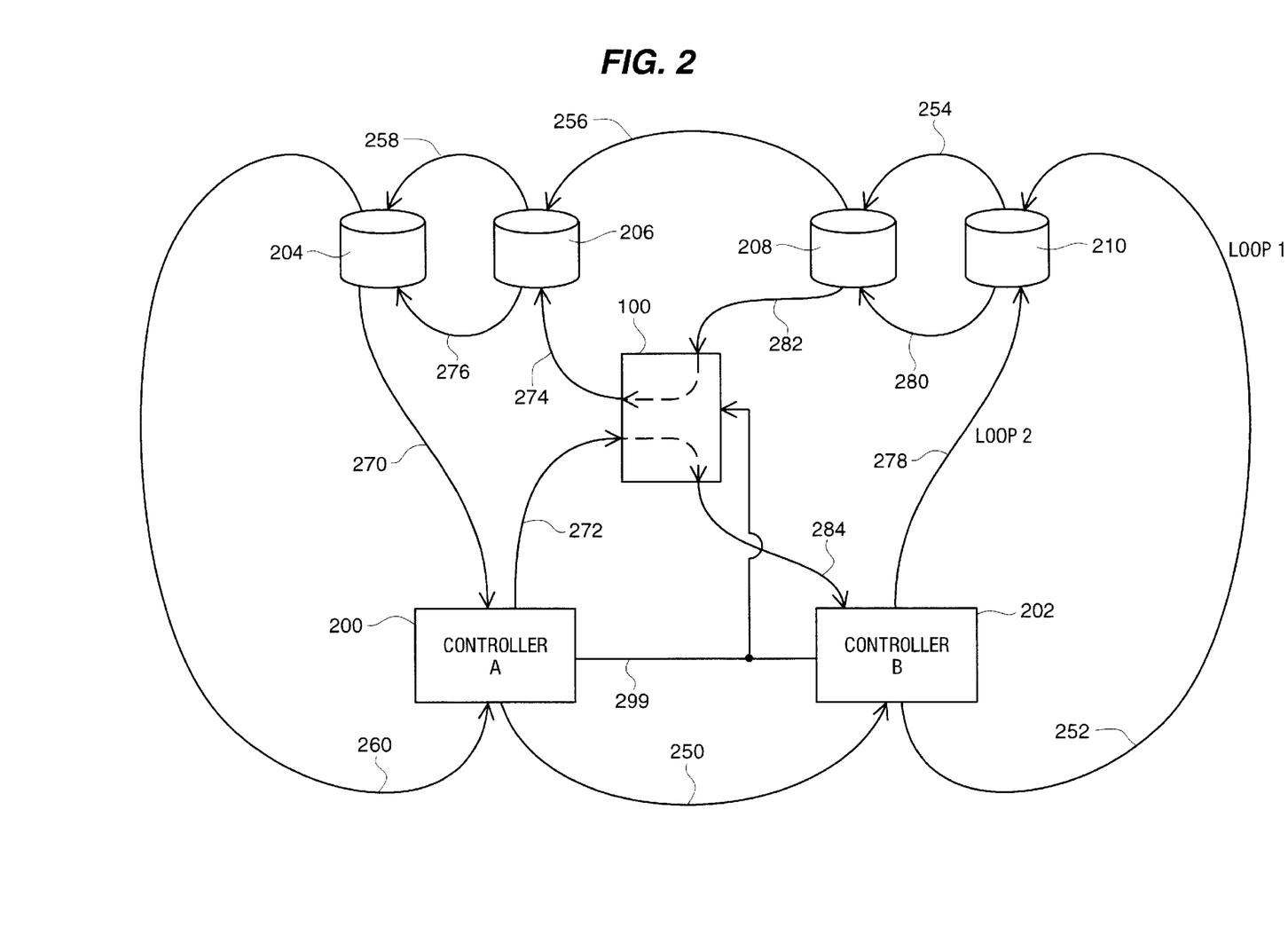
FIG. 2 is a block diagram a communication loop environment with an LIC of the present invention inserted therein to join two loop portions.
Figure 4:
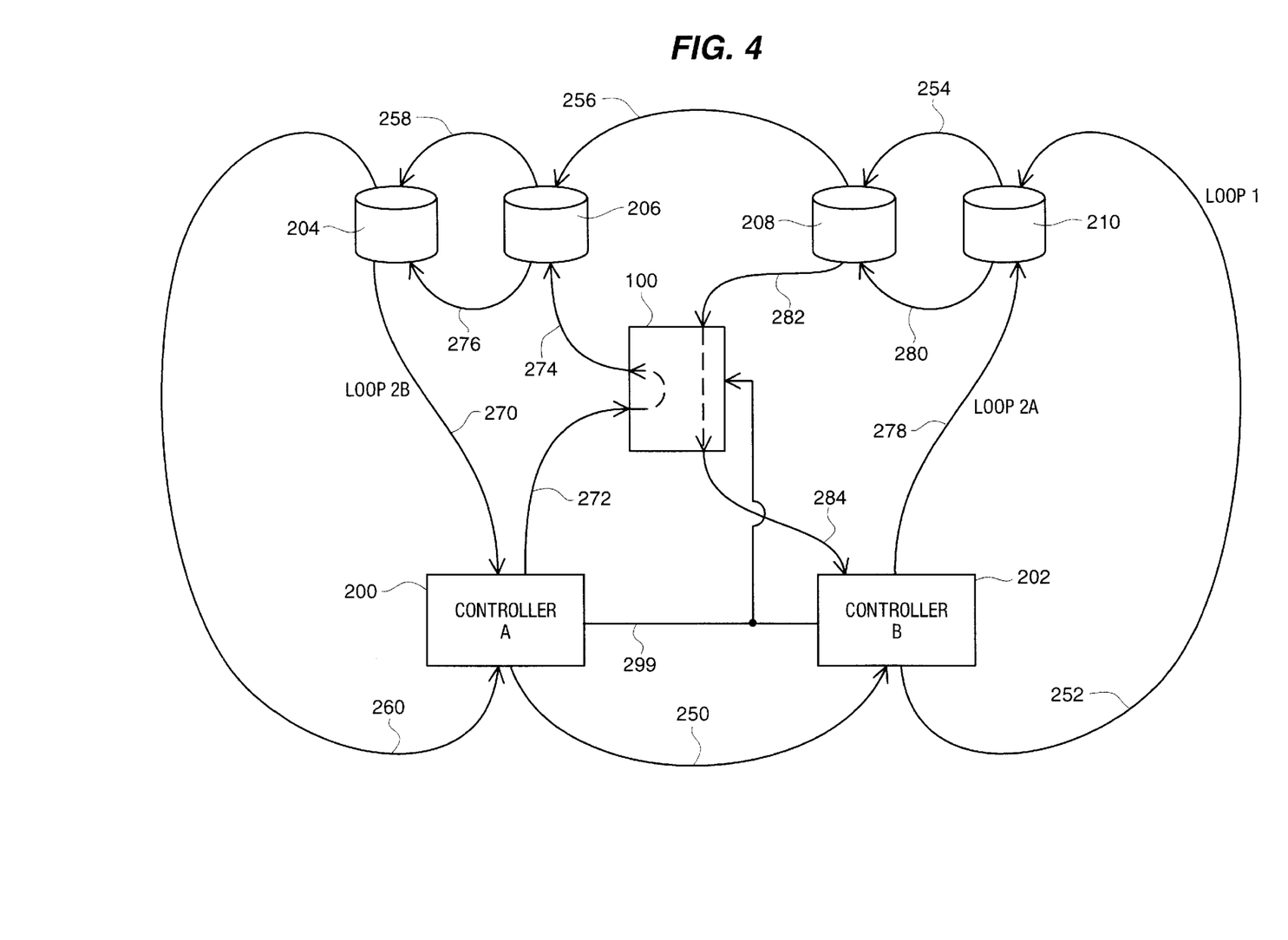
FIG. 4 is a block diagram a communication loop environment with an LIC of the present invention inserted therein to subdivide a loop into two loop portions.

FIGS. 2 and 4 are block diagrams of an LIC circuit 100 in a loop communication application. Two control devices, controller A 200 and controller B 202, share access to a plurality of storage devices, 204–210, via redundant communication loops. The first loop comprises loop segments 250–260 (collectively referred to as loop 1). The second of the redundant pair of communication loops comprises loop segments 270–284 (collectively referred to as loop 2). All devices, control devices 200 and 202 as well as storage devices 204–210, can access all other devices on either of the redundant communication loops. The LIC 100 of FIG. 2 is in the above identified first state to join loop segments 272, 274, 282, and 284, in such a way as to make a single communication loop from segments 270–284. Either of control devices 200 and 202 may control the selection of LIC circuit 100 via signals applied to path 299.

The LIC of FIG. 4 is in the second of the above identified states wherein the second loop is subdivided into two loops. The first subdivided loop comprises loop segments 270–276 (collectively referred to as loop 2A). The second subdivided loop comprises loop segments 278–284 (collectively referred to as loop 2B). In this subdivided loop state, only controller A 200 may access storage device 204 and 206 on loop 2B and only controller B 202 may access storage devices 208 and 210 on loop 2A. The reduced size of each of the subdivided loops enhances the performance of the accesses between devices on each loop by reducing the node count for information flowing therebetween, and doubles the available bandwidth by enabling simultaneous operation of two loop portions, loop 2A and 2B.

If access to a device on loop 1 is lost due to failure of a loop portion, then loops 2A and 2B of FIG. 4 may be rejoined by LIC circuit 100 as shown in FIG. 2. Such a reconfiguration restores full access among all devices on loop 1 using the redundant single loop 2 of FIG. 2.

LIC BEST KNOWN MODE

A second embodiment representing the best presently known mode of implementing the present invention is depicted in FIGS. 5A–7B. In arrayed storage devices (e.g., RAID storage subsystems) it is common to have clusters (blocks) of storage devices (disk drives) easily removable as a unit. In view of this common feature, the LIC of the present invention is distributed within a plurality of device block interface circuits. Each device block interface circuit has a plurality of drive port circuits within each able to accept a loop communication enabled (e.g., FC-AL) disk drive from a clustered unit. A port bypass circuit (as taught in co-pending patent application 96-025) circuit in each drive port circuit of the device block interface is adapted to allow the daisy-chained communication medium to bypass any missing or non-functional disk drive at each drive port.

The MUX devices of the LIC are split among adjacent pairs of device block interface units. The LIC circuit is therefore subdivided such that one of the MUX devices is contained in a first device block interface and the mated MUX device of the LIC is in a second, adjacent, connected device block interface. Additional logic associated with the LIC in a device block interface switches the LIC state when a loss of signal is detected from an adjacent, connected device block interface. A loss of signal would typically indicate a cabling failure between the two devices.

Figure 5A:
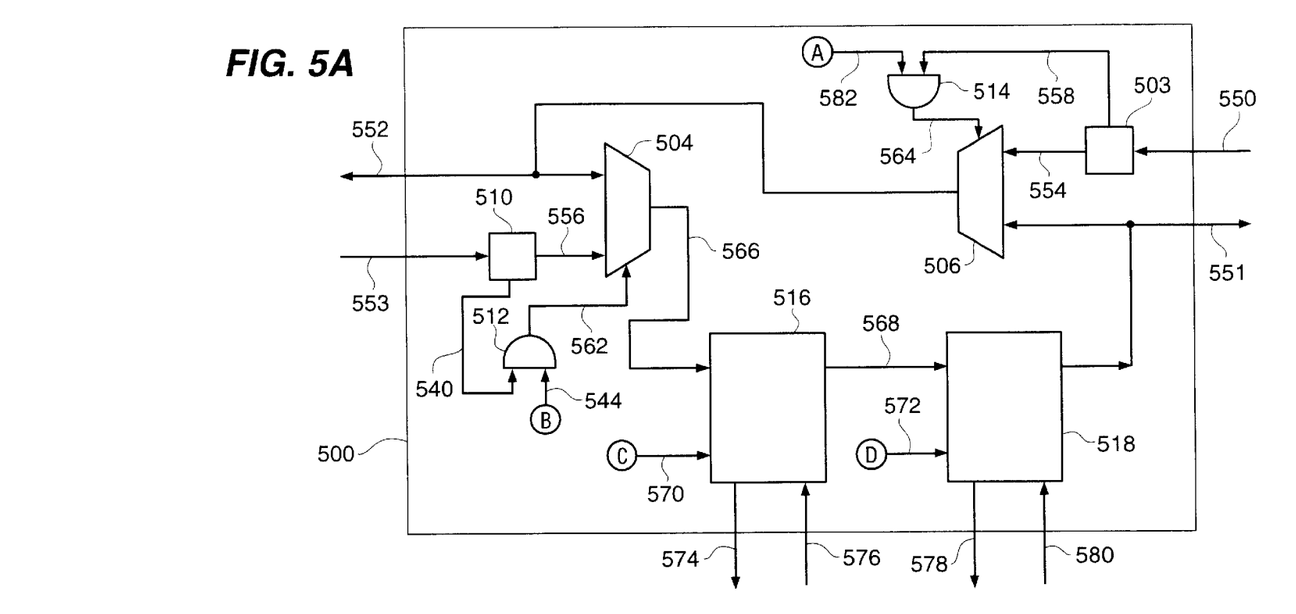
FIGS. 5A–5D are block diagrams of an alternate embodiment of the LIC of the present invention including a functional presentation of the two selectable states of the LIC.

FIG. 5A is a block diagram of the device block interface 500 (DBI) embodying an LIC of the present invention. DBI 500 includes a plurality of disk port circuits 516 (DPC) to connect one or more storage devices (not shown) into the daisy-chained communication medium. During normal operation, transmitted information is received on path 553 from a neighboring "upstream" device (not shown) on the daisy-chain communication medium. The signal passes through loss of signal detector 510 (LOS) onto path 556 to MUX 504. MUX 504 is normally selected to pass its input path 556 through to output path 566. DPC 516 then receives the information on path 566 and either passes it through an attached storage device on path 574 and 576 thence onto path 568, or bypasses the storage device to pass the signals directly from path 566 to path 568. A next DPC 518 receives signal on path 568 and either passes it through an attached storage device (not shown) via paths 578 and 580 thence onto path 551, or bypasses the storage device to apply the signals on path 568 directly to path 551. Any number of disk port circuits and attached storage devices may be active within this chain between paths 566 and 551.

Path 551 then connects DBI 500 to a neighboring "downstream" device on the daisy-chained communication medium. A return path for the daisy-chained communication loop is provided from path 550 through to path 552. Specifically, path 550 connects DBI 500 to its "upstream" neighbor. Signals on path 550 normally pass through LOS 508 onto path 554 as an input to MUX 506. MUX 506 is normally selected to pass its input on path 554 through to its output path 552. Path 552 connects DBI 500 to its "downstream" neighbor.

Figure 5B:
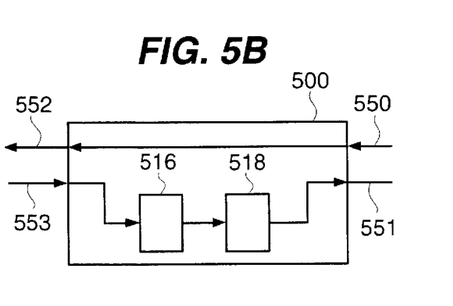

As shown in the diagram of FIG. 5B, DBI 500 connects to a neighbor on its left side via paths 552 and 553 and to a neighbor on its right side via paths 550 and 551. In normal operation DBI 500 receives transmitted information from its left side neighbor device on path 553, passes the transmission through one or more storage devices each attached to one of a plurality of DPCs (e.g., 516 and 518), then passes the transmission on to its right side neighbor device on path 551. The return path for the communication loop starts with information received from the right side neighbor on path 550 and passes through DBI 500 to its left side neighbor on path 552.

Figure 5C:
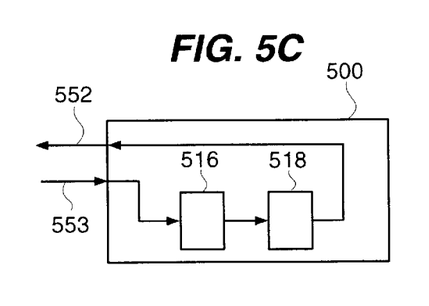

Control signals on paths 582 and 584 (labeled "A" and "B", respectively) may alter the standard selection of MUX 506 and 504, respectively. When a control device (not shown) applies a signal to label "A" path 582, OR gate 514 applies that signal to path 564 to alter the selection of input signals by MUX 506. When so selected, MUX 506 applies its input signal path 551 to its output path 552. This state effectively disconnects all devices to the right of DBI 500 from the loop portion containing DBI 500. FIG. 5C depicts this state in which signal received by DBI 500 on path 553 are effectively routed through the DPCs 516 and 518 and back to loop return path 552 via path 551 and MUX 506.

Figure 5D:
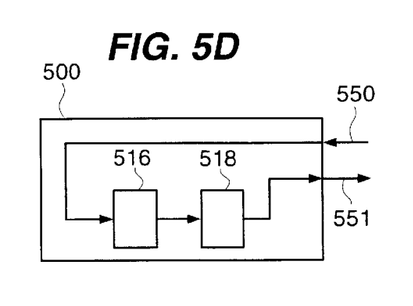

Similarly, when a control device (not shown) applies a signal to label "B" path 584, OR gate 512 applies that signal to path 562 to alter the selection of input signals by MUX 504. When so selected, MUX 504 applies its input signal path 552 to its output path 566. This state effectively disconnects all devices to the left of DBI 500 from the loop portion containing DBI 500. FIG. 5D depicts this state in which signal received by DBI 500 on path 550 are effectively routed through the DPCs 516 and 518 via path 552, MUX 504, and path 566, then back to loop return path 551.

Figure 6:
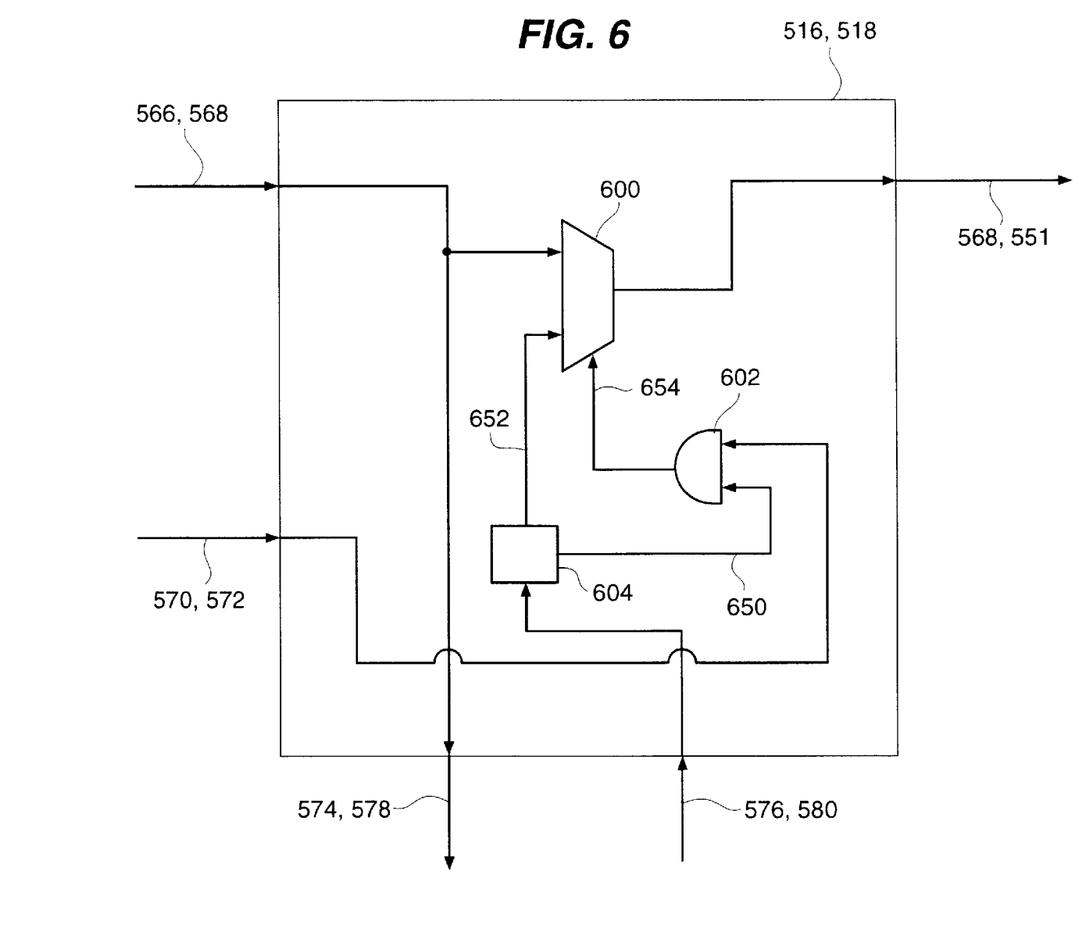
FIG. 6 is a block diagram showing additional detail of the drive port circuit of the LIC of FIG. 5A.

FIG. 6 is a block diagram depicting the DPC 516 and 518 in additional detail. Each DPC 516 and 518 is essentially a port bypass circuit as described in co-pending patent application 96-025. Since they are identical to one another than the paths which connect them to other components, both will be described herein with reference only to DPC 516. Transmissions received on path 566 are applied as an input to MUX 600 and applied to path 574. A storage device (e.g., disk drive—not shown) receives the signals on path 574 and processes them as required to pass on signals to path 576. Signal detect unit 604 (SDU) senses the absence or failure of the storage device based upon the signals received from path 576 and applies the received signals to path 652 as another input to MUX 600. In addition, SDU 604 applies a signal to path 650 to indicate that the storage device has failed or is not present. OR gate 602 receives one input signal from SDU 604 on path 650 and a second input signal from path 570 (a control signal generated by a control device—not shown). If either signal indicates that the storage device is to be bypassed (due to failure, absence, or controlled configuration matters) then OR gate 602 applies a signal to control the selection of MUX 600.

Therefore, when an enabled, operation storage device is attached to paths 574 and 576, DPC 516 is operable to connect the device to the daisy-chained communication medium via paths 566, 574, 576, 652, and 568 through SDU 604 and MUX 600. When no operable device is detected by SDU 604 or none when the device is disabled by the control device (not shown), the storage device is bypassed by connecting the daisy chain medium without the device via paths 566 and 568 through MUX 600.

As noted above, DBI 500 incorporates a plurality of such DPCs to permit a plurality of storage devices to be easily configured in or out of the daisy-chained communication loop.

Further, referring again to FIG. 5A, LOS 508 in conjunction with OR gate 514 are operable to automatically changes the selected state of MUX 506 to that of FIG. 5C when LOS 508 detects loss of all signal from its input path 550. Similarly, LOS 510 in conjunction with OR gate 512 are operable to automatically changes the selected state of MUX 504 to that of FIG. 5D when LOS 510 detects loss of all signal from its input path 553. Each LOS 508 and 510 thereby reconfigures the communication loop automatically in response to, for example, unintended disconnection of a cable or outright failure of a cable or of a neighboring device on the daisy-chain.

Figure 7A:
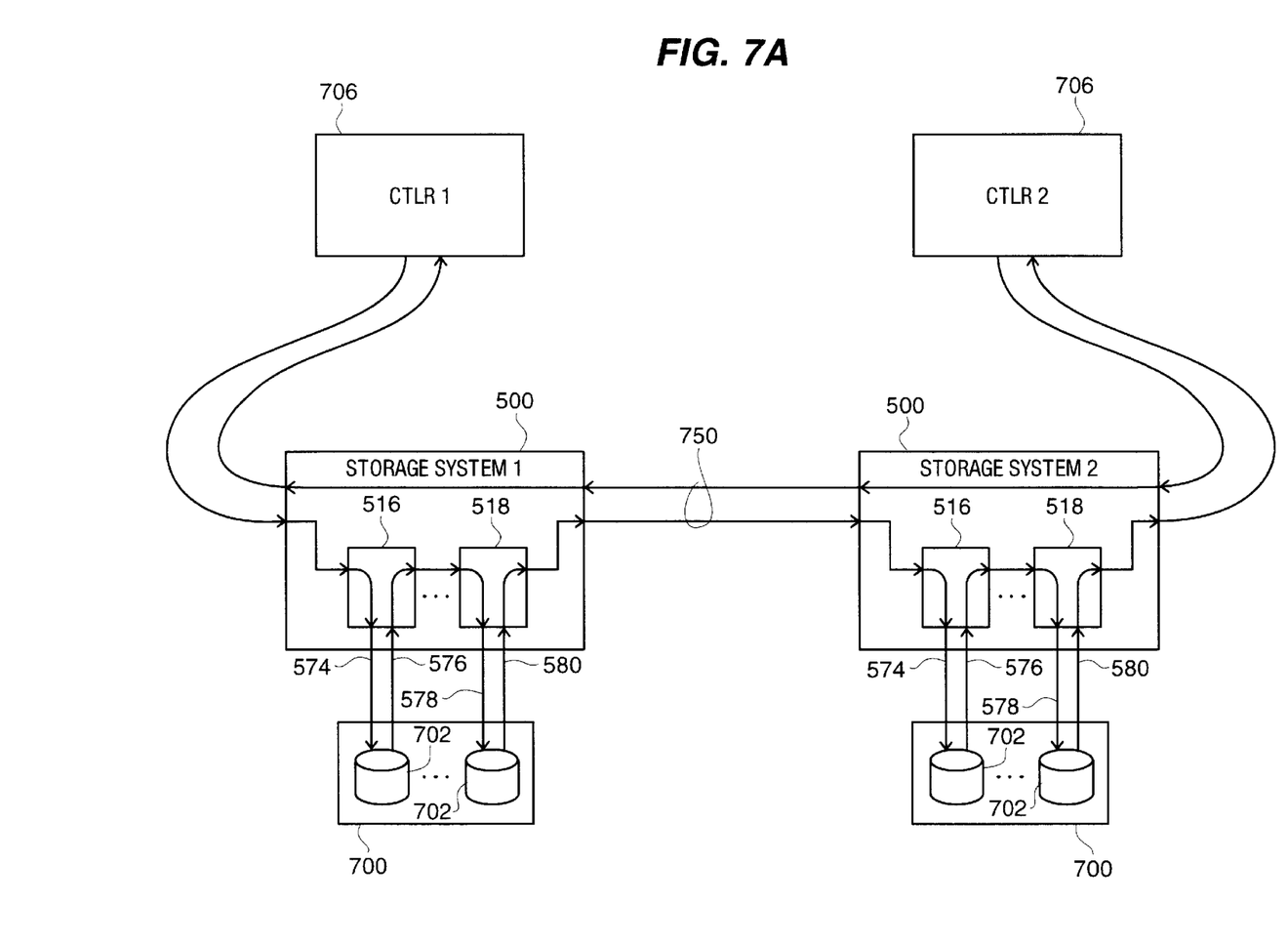
FIGS. 7A and 7B are block diagrams showing exemplary application of the LIC of FIG. 5A in each of two operational states.
Figure 7B:
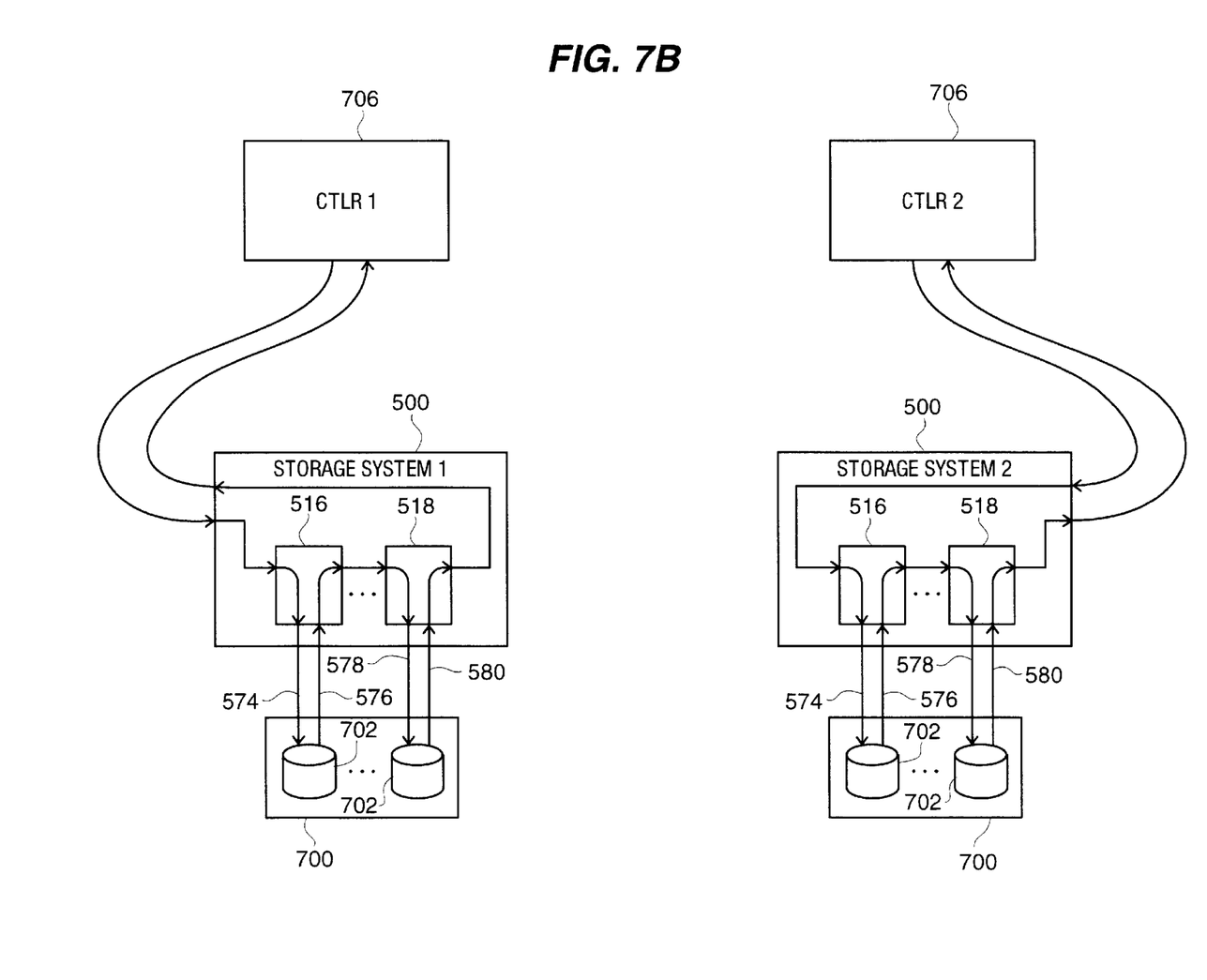

FIGS. 7A and 7B are block diagrams depicting the application of DBI 500 embodying the LIC of the present invention. Two controller devices 706 (CTLR 1 and CTLR 2) are connected to two shared storage modules 700 through two DBIs 500. All devices are connected via a common daisy-chained communication loop. When cables 750 between the DBIs 500 are broken or fail, the two DBIs 500 will automatically reconfigure the single loop to create two function loop portions as shown in FIG. 7B. As noted above, control means (such as controllers 706) may apply signals to the DBIs 500 to force the same subdivision of the larger loop into two (or more) smaller loops.

In particular, the left DBI 500 switches its LIC MUX 504 from the state depicted in FIG. 5B to that of FIG. 5C while the right DBI 500 switches its LIC MUX 506 from the state depicted in FIG. 5B to that of FIG. 5D.

As noted above, subdivision of a larger loop into smaller loop portions increases available bandwidth, thereby improving subsystem performance, by multiplying the number of loop portions which may be simultaneously active. The subdivision further improves performance by reducing the node count on each loop portion to thereby reduce the node delay for message transferred around the loop.

Further as noted above, a second, redundant large loop may be connected to all devices of FIGS. 7A and 7B to allow continued connectivity among all devices on the original larger loop.

SSA APPLICATION OF THE LIC

SSA application derive another, related benefit from application of the LIC of the present invention. As noted above, in accordance with SSA communication standards, one node transmits messages to another node in a first direction in the SSA medium and responses thereto are transmitted in the opposite direction on the same medium. Intervening nodes between the pair of communicating nodes (the count of which is referred to as a hop count) are idled by such communication in that they remain in a passthrough mode simply transferring information from an upstream neighbor the downstream neighbor in the daisychain. Though in general other nodes may utilize unused segments of the SSA medium (portions not between a pair of communicating nodes) through known spatial reuse techniques, the nodes which intervene between two communicating nodes are precluded therefrom. The LIC of the present invention is therefore beneficially applied to SSA communication applications to allow reconfiguration of the SSA topology so as to reduce the number of intervening node between a particular pair of node which require frequent and/or rapid communication.

One common application of SSA media to storage subsystems utilizes redundant loops interconnecting all devices on the loops. A first loop is used for communication in one direction and the second loop is used for communication in the opposite direction. Messages sent from one node to another stop at the destination node rather than traveling further in the loop. Any reply message is sent in the opposite direction on the opposite loop back to the originator of the communication. The number of intervening nodes between two communication nodes is therefore a limiting factor on the performance of SSA communication subsystems.

In certain applications, it may desirable to minimize the hop count (intervening nodes) between a particular pair of nodes while in other applications of the same subsystem, another pair may represent a performance bottleneck. The LIC of the present invention, as applied to SSA communication loops, enables dynamic reconfiguration of the redundant loops to alter the hop count between particular nodes.

For example, in storage applications having redundant control modules, there may be applications where the hop count between the two controllers is more critical than the hop count between either controller and the storage devices. For example, if the controllers are initialized to operate as redundant/mirrored devices, there may be substantial communication between the controllers to synchronize their operations. In such an instance, it may be preferred to minimize the hop count between the two controllers at the cost of increasing the hop count between each controller and certain of the storage devices. However, if the controllers are initialized for non-mirrored, independent operation, it may be preferred to minimize the average hop count between each controller and any of the storage devices since there will be little or no communication required between the independent controller. Both situations may arise within the same storage subsystem. The particular initialization may depend on a number of external factors. The present invention therefore allows the storage subsystem to reconfigure the relative positions of the devices on the SSA loops.

Figure 8A:
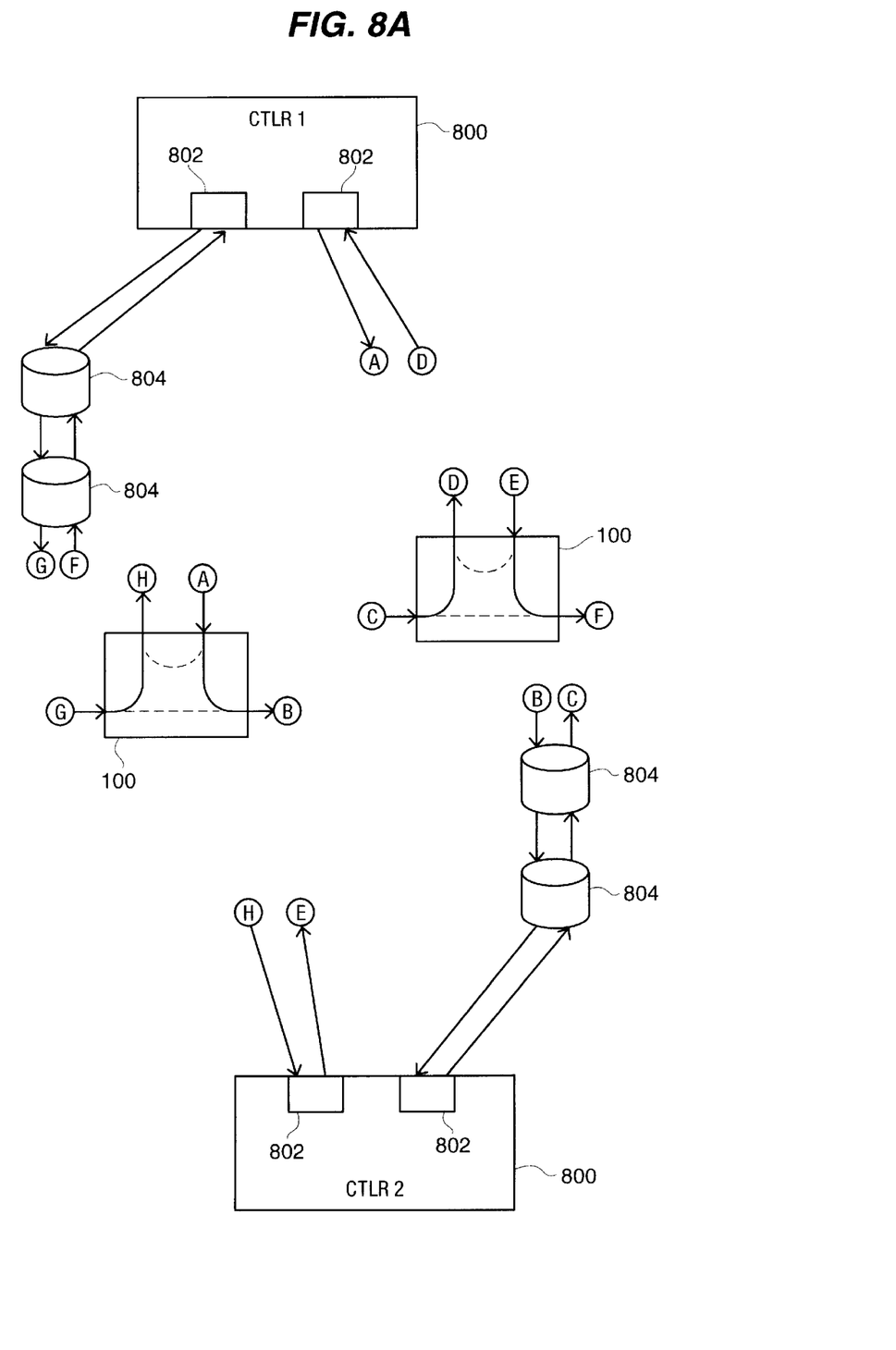
FIGS. 8A–8C are block diagrams of another embodiment of the LIC of the present invention as applied to reconfiguration of relative device positions and functional presentations of the two selectable states of the LIC.

FIG. 8A is a block diagram showing two controllers 800 (CTLR 1 and CTLR 2) connected via SSA communication loops to four storage devices 804. Each controller 800 has two SSA loop control components 802. The LIC of the present invention as applied in FIG. 8A comprises two LRC circuits 100 as taught in co-pending patent application 96-025. The paths that interconnect the controllers 800, storage devices 804, and LRCs 100 are shown with terminator labels for graphical clarity.

One LRC circuit 100 (the left one) has two inputs labeled "A" and "G", respectively, and two outputs labeled "H" and "B", respectively. The other LRC 100 (the right one) has two inputs labeled "C" and "E", respectively, and two outputs labeled "D" and "F", respectively.

In a first state of the LRCs 100, inputs are connected to outputs as follows:

$$G \Rightarrow H$$
$$A \Rightarrow B$$
$$C \Rightarrow D$$
$$E \Rightarrow F$$

Figure 8B:
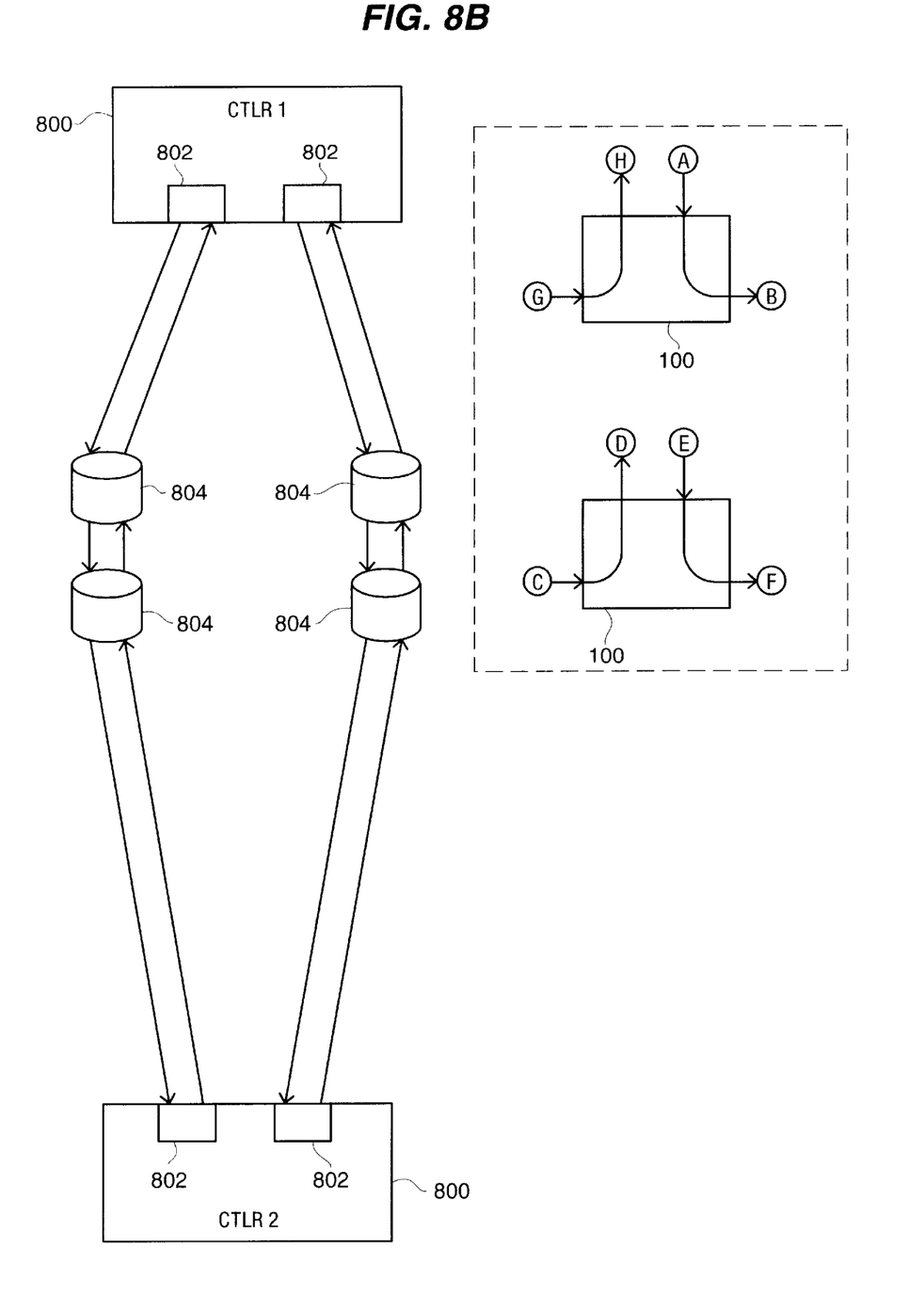

The connection resulting from this state of the LRCs 100 is shown in FIG. 8B. For graphical clarity in FIG. 8B, the LRCs 100 are shown to the side in a dashed box to make the logical connections clearer. In this state, each controller 800 is separated from the other controller 800 by a hop count of two (two intervening storage devices 804 on either of the two loops). However, no storage device 804 is separated from a controller 800 by more than a hop count of one.

Figure 8C:
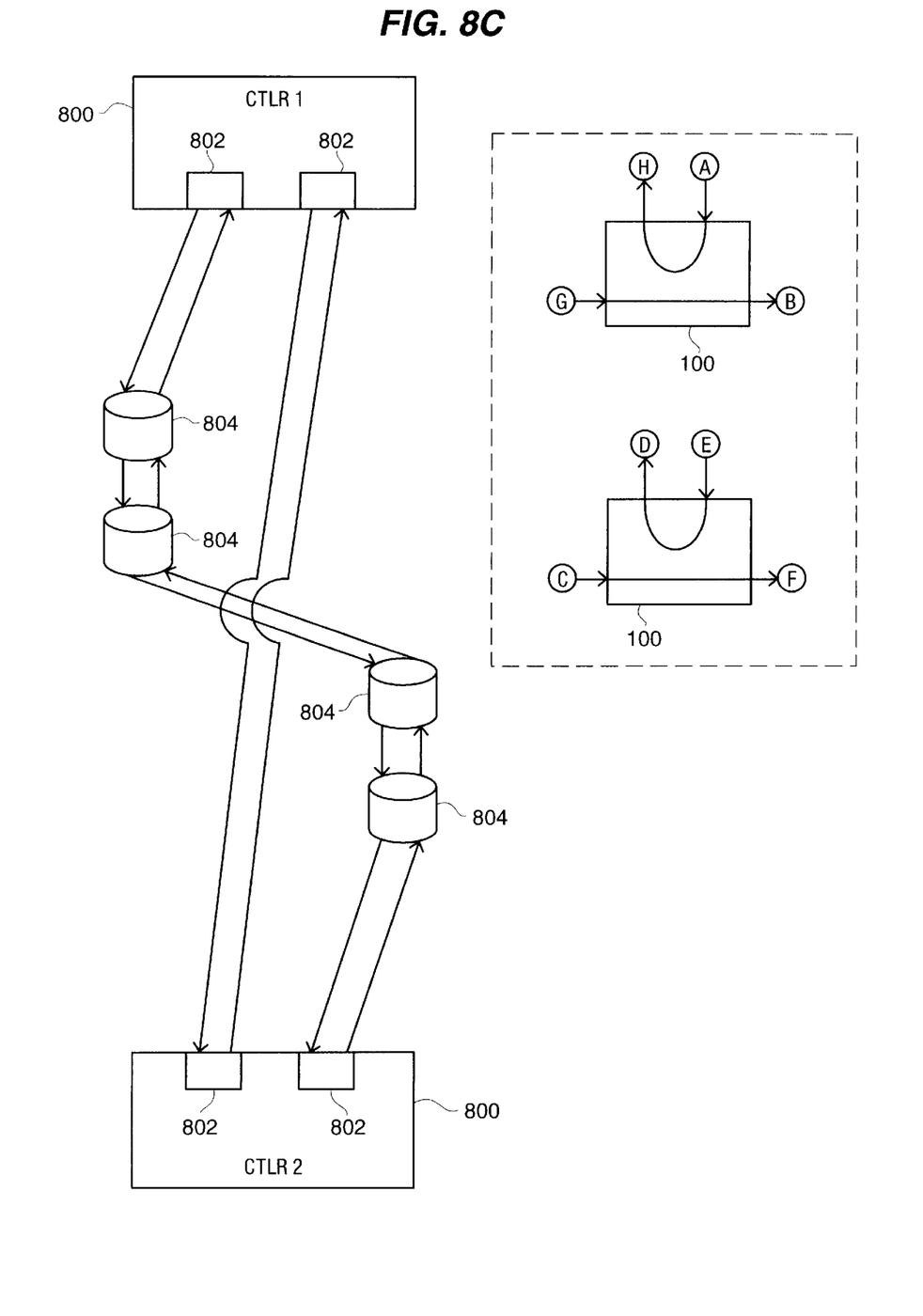

In a second state of the LRCs 100, inputs are connected to outputs as follows:

$$G \Rightarrow B$$

-continued $$A \Rightarrow H$$
$$C \Rightarrow F$$
$$E \Rightarrow D$$

The connection resulting from this state of the LRCs 100 is shown in FIG. 8C. For graphical clarity in FIG. 8C, the LRCs 100 are shown to the side in a dashed box to make the logical connections clearer. In this state, each controller 800 is separated from the other controller 800 by a hop count of zero (no intervening storage devices 804 on one loop). However, storage devices 804 are separated from either controller 800 by more than a hop counts of 0–3 depending on the device to be accessed.

In this second state, communications between the redundant controllers 800 may be improved at the cost of certain communications between either controller 800 and the furthest storage devices 804.

One of ordinary skill will readily recognize that the present invention may be similarly applied to SSA topologies other than loop configurations. More generally, the present invention permits reconfiguration any daisy-chained communication configuration. Such reconfiguration may be for purposes of improving the utilization of existing communication bandwidth as well as for purposes of increasing the available bandwidth by permitting more extensive parallel operation of the portions or segments of the communication medium. Those skilled in the art will therefore recognize many equivalent applications of the LIC of the present invention to Fibre Channel communications, SSA communications, and a number of similar daisy-chained communication media and protocols.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for using a loop isolation circuit to reconfigure a redundant pair of Fibre Channel communication loop media to modify node delay bandwidth overhead comprising the steps of:

reducing node delay bandwidth overhead by subdividing said redundant pair of Fibre Channel communication loop media into two independent redundant pairs of communication loop portions wherein each of said loop portions provides redundant connectivity to each device attached thereto; and increasing node delay bandwidth overhead by joining said two independent redundant pairs of communication loop portions into a single redundant pair of Fibre Channel communication loop media wherein said single loop provides redundant connectivity to each device attached thereto.

2. A method for using a loop isolation circuit to reconfigure a redundant pair of Fibre Channel communication loop media to modify available bandwidth comprising the steps of:

increasing available bandwidth by subdividing said redundant pair of Fibre Channel communication loop media into two independent redundant pairs of communication loop portions wherein each of said loop portions provides redundant connectivity to each device attached thereto; and reducing available bandwidth by joining said two independent redundant pairs of communication loop portions into a single redundant pair of Fibre Channel communication loop media wherein said single loop provides redundant connectivity to each device attached thereto.

3. A storage system comprising:

a first set of storage devices;

a second set of storage devices;

a first loop communication link connecting said first set of storage devices and said second set of storage devices;

a loop isolation circuit; and a second loop communication link connecting said first set of storage devices said second set of storage devices and said loop isolation circuit, wherein said loop isolation circuit is operable to controllably subdivide said second loop communication link into two loops portions, and wherein said loop isolation circuit is further operable to controllably join said two loop portions to restore said second loop communication link.

4. The system of claim 3 further comprising:

a first storage controller connected to said first loop communication link and connected to said second loop communication link and connected to said first loop portion; and a second storage controller connected to said first loop communication link and connected to said second loop communication link and connected to said second loop portion.

5. The system of claim 4 wherein said loop isolation circuit is coupled to at least one controller of said first storage controller or said second storage controller and wherein said loop isolation circuit is operable in response to a control signal received from said at least one controller.

6. The system of claim 3 wherein said first loop communication link comprises a Fibre Channel Arbitrated Loop and wherein said second loop communication link comprises a Fibre Channel Arbitrated Loop.

7. A storage system comprising:

a plurality of Serial Storage Architecture devices;

a Serial Storage Architecture loop communication link connecting said devices; and a loop isolation circuit connected to said Serial Storage Architecture loop communication link, wherein said loop isolation circuit is operable to controllably reconfigure said Serial Storage Architecture loop to modify the hop count between at least two of said devices.

8. The system of claim 7 wherein said plurality of Serial Storage Architecture devices includes:

a first storage controller connected; and a second storage controller, wherein said loop isolation circuit is operable to reconfigure said Serial Storage Architecture loop in one of two states wherein in a first state the hop count between said first storage controller and said second storage controller is less than the hop count in a second state.

9. The system of claim 8 wherein said loop isolation circuit is coupled to at least one controller of said first storage controller or said second storage controller and wherein said loop isolation circuit is operable in response to a control signal received from said at least one controller.

10. A method for using a loop isolation circuit to reconfigure a Serial Storage Architecture pair of communication loop media to modify hop count between two devices of a plurality of devices on said media comprising the steps of:

reducing said hop count by configuring said loop isolation circuit into a first pre-determined state having each of said plurality of devices interconnected via both of said pair of redundant communication loop media; and increasing said hop count by configuring said loop isolation circuit into a second pre-determined state having each of said plurality of devices interconnected via both of said pair of redundant communication loop media.

* * * * *